(12) United States Patent
Case et al.

(10) Patent No.: US 10,076,074 B2
(45) Date of Patent: Sep. 18, 2018

(54) REVERSIBLE SEEDER TRANSMISSION AND SEEDER DRIVE APPARATUS

(71) Applicant: Actuant Corporation, Menomonee Falls, WI (US)

(72) Inventors: James R. Case, Brackney, PA (US); Kevin G. Shaw, Binghamton, NY (US)

(73) Assignee: Actuant Corporation, Menomonee Falls, WI (US)

( * ) Notice: Subject to any disclaimer, the term of this patent is extended or adjusted under 35 U.S.C. 154(b) by 525 days.

(21) Appl. No.: 14/427,358

(22) PCT Filed: Sep. 11, 2013

(86) PCT No.: PCT/US2013/059131
§ 371 (c)(1),
(2) Date: Mar. 11, 2015

(87) PCT Pub. No.: WO2014/043161
PCT Pub. Date: Mar. 20, 2014

(65) Prior Publication Data
US 2015/0342113 A1  Dec. 3, 2015

Related U.S. Application Data

(60) Provisional application No. 61/699,385, filed on Sep. 11, 2012.

(51) Int. Cl.
*F16H 57/00* (2012.01)
*A01C 19/00* (2006.01)
(Continued)

(52) U.S. Cl.
CPC ........... *A01C 19/00* (2013.01); *F16H 57/033* (2013.01); *F16H 57/039* (2013.01); *Y10T 74/19642* (2015.01)

(58) Field of Classification Search
CPC ...... A01C 19/00; F16H 57/033; F15H 57/039
See application file for complete search history.

(56) References Cited

U.S. PATENT DOCUMENTS 1,871,528 A   8/1932  Joline
3,364,769 A   1/1968  Etherton, Sr.
(Continued)

FOREIGN PATENT DOCUMENTS

CA   2288481   4/2000
CH    323545   8/1957
(Continued)

OTHER PUBLICATIONS

First Office Action from the State Intellectual Property Office of the People's Republic of China for Application No. 201280028778.2 dated Jun. 25, 2015 (20 pages).
(Continued)

*Primary Examiner* — David M Fenstermacher
(74) *Attorney, Agent, or Firm* — Michael Best & Friedrich LLP

(57) ABSTRACT

An apparatus for transmitting power from a drive shaft (24) to a seed meter shaft of a seed metering device includes a transmission (26). A transmission housing (28) has a first housing section (30) and an identical second housing section (30). The first housing section (30) and the second housing section (30) together define a first internal passageway (44) and a second internal passageway (50). The transmission further includes a first transmission element (46) rotatably supported by the first housing section (30) and the second housing section (30) in the first internal passageway (44). The first transmission element (46) connects to one of the drive shaft (24) and the seed meter shaft. The transmission further includes a second transmission element (54) rotatably supported by the first housing section (30) and the second housing section (30) in the second internal passage-
(Continued)

way (50). The second transmission element (54) engages the first transmission element (46) and connects to the other of the drive shaft (24) and the seed meter shaft.

20 Claims, 6 Drawing Sheets

(51) Int. Cl.
F16H 57/039 (2012.01)
F16H 57/033 (2012.01)

(56) References Cited

U.S. PATENT DOCUMENTS

| | | | |
|---|---|---|---|
| 4,779,471 | A | 10/1988 | Rettig |
| 5,024,173 | A | 6/1991 | Deckler |
| 5,078,066 | A | 1/1992 | Lafferty |
| 5,170,909 | A | 12/1992 | Lundie et al. |
| 5,497,715 | A | 3/1996 | Meek et al. |
| 6,520,100 | B1 | 2/2003 | Spooner, Sr. et al. |
| 6,672,228 | B1 | 1/2004 | Groelz et al. |
| 6,715,433 | B1* | 4/2004 | Friestad .............. A01C 15/006 111/177 |
| 6,729,250 | B2* | 5/2004 | Friestad ............... A01C 19/00 111/177 |
| 6,745,710 | B2* | 6/2004 | Friestad ............... F16D 1/0894 111/178 |
| 6,758,153 | B1 | 7/2004 | Hagen et al. |
| 7,273,016 | B2* | 9/2007 | Landphair ............ A01C 19/02 111/185 |
| 7,377,221 | B1 | 5/2008 | Brockmeier |
| 7,467,698 | B2 | 12/2008 | Dillman |
| 7,497,176 | B2 | 3/2009 | Dillman |
| 7,571,688 | B1* | 8/2009 | Friestad ............... A01C 19/04 111/200 |
| 7,617,785 | B2 | 11/2009 | Wendte |
| 7,717,048 | B2 | 5/2010 | Peterson, Jr. et al. |
| 7,735,438 | B2* | 6/2010 | Riewerts ............... A01C 7/102 111/185 |
| 8,577,561 | B2* | 11/2013 | Green .................. A01B 79/005 111/200 |
| 8,936,143 | B2 | 1/2015 | Wagers |
| 9,366,297 | B2* | 6/2016 | Hause .................... F16D 11/00 |
| 9,591,800 | B2* | 3/2017 | Kowalchuk ............ A01C 7/102 |
| 2002/0178981 | A1* | 12/2002 | Drummond ........... A01C 19/00 111/200 |
| 2004/0025764 | A1 | 2/2004 | Friestad et al. |
| 2004/0025765 | A1 | 2/2004 | Friestad et al. |
| 2008/0110382 | A1 | 5/2008 | Brockmeier |
| 2009/0090283 | A1 | 4/2009 | Riewerts |
| 2010/0162931 | A1 | 7/2010 | Cannon et al. |
| 2010/0294612 | A1 | 11/2010 | Mariman et al. |
| 2010/0300342 | A1 | 12/2010 | Peterson et al. |
| 2012/0266795 | A1 | 10/2012 | Silbernagel et al. |
| 2014/0057728 | A1 | 2/2014 | Hause |
| 2015/0020625 | A1 | 1/2015 | Hause et al. |
| 2015/0342113 | A1 | 12/2015 | Case |

FOREIGN PATENT DOCUMENTS

| | | |
|---|---|---|
| CN | 2139770 | 8/1993 |
| CN | 1313937 | 9/2001 |
| CN | 2679986 | 2/2005 |
| CN | 201345821 | 11/2009 |
| EP | 1619418 | 1/2006 |
| GB | 705429 | 3/1954 |
| GB | 2404704 | 2/2005 |
| WO | 0051412 | 9/2000 |
| WO | WO 2006065032 | 6/2006 |

OTHER PUBLICATIONS

Second Office Action from the State Intellectual Property Office of the People's Republic of China for Application No. 201280028778.2 dated Mar. 16, 2016 (5 pages).
Third Office Action from the State Intellectual Property Office of the People's Republic of China for Application No. 201280028778.2 dated Sep. 21, 2016 (10 pages).
PCT/US2012/032484 International Search Report and Written Opinion of the International Searching Authority dated Jun. 20, 2012 (9 pages).
PCT/US2012/032484 International Preliminary Report on Patentability and Written Opinion of the International Searching Authority dated Oct. 15, 2013 (4 pages).
PCT/US2013/024261 International Search Report dated May 8, 2013 (2 page).
PCT/US2013/024261 International Preliminary Report on Patentability and Written Opinion of the International Searching Authority dated Aug. 12, 2014 (2 page).
Office Action from the U.S. Patent and Trademark Office for U.S. Appl. No. 14/111,601 dated Mar. 12, 2015 (18 pages).
Office Action from the U.S. Patent and Trademark Office for U.S. Appl. No. 14/377,660 dated Jul. 21, 2016 (21 pages).
EP12864837.5 Extended European Search Report dated May 23, 2016 (7 pages).
PCT/US2013/059131 International Preliminary Report on Patentability and Written Opinion of the International Searching Authority dated Mar. 26, 2015 (13 pages).
International Search Report for Application No. PCT/US2013/059131 dated Mar. 17, 2014 (4 pages).
First Office Action from The State Intellectual Property Office of China for Application No. 201380058503.8 dated Jun. 20, 2016 (30 pages).
Second Office Action from The State Intellectual Property Office of the People's Republic of China for Application No. 201380058503.8 dated May 3, 2017 (32 pages).
Office Action from the Patent Office of the Russian Federation for Application 2015113374 dated October Oct. 3, 2017 (7 pages English translation included).

* cited by examiner

US 10,076,074 B2

REVERSIBLE SEEDER TRANSMISSION AND SEEDER DRIVE APPARATUS

CROSS-REFERENCE TO RELATED APPLICATION

This application claims priority to U.S. Provisional Application No. 61/699,385 filed Sep. 11, 2012, the disclosure of which is hereby incorporated by reference for all purposes.

STATEMENT CONCERNING FEDERALLY SPONSORED RESEARCH OR DEVELOPMENT

Not applicable.

FIELD OF THE INVENTION

This invention relates to seeder transmissions, particularly reversible seeder transmissions that facilitate ease of manufacturing.

BACKGROUND OF THE INVENTION

Agricultural seeding implements, such as row crop planting implements and the like, typically include multiple seed metering devices that separate seeds from one another such that individual seeds can be dispensed at consistent intervals. Such seed metering devices can take various forms. For example, some seed metering devices use a vacuum to direct seeds, while others employ seed-selecting "fingers". Regardless of their specific construction, all of the seed metering devices on a planting implement are typically driven by a common drive shaft. Moreover, each seed metering device connects to a separate drive system that transmits power from the common drive shaft to the seed metering device.

The drive systems described above typically include a first transmission (for example, a helical gear drive) driven by the common drive shaft. The first transmission drives a flexible shaft, which in turn drives a second transmission (for example, another helical gear drive). The second transmission drives a shaft connected to the seed metering device. Such drive systems advantageously permit relative motion between a portion of the implement supporting the common drive shaft and a planting unit supporting the seed metering device to facilitate, for example, planting on uneven surfaces.

However, these drive systems also have a number of drawbacks. For example, the drive systems include several similar, albeit different, components. These components include, for example, the various housing sections of the transmissions. These components can be mistaken for one another, which can increase the difficulty of and increase the time required for manufacturing. Furthermore, manufacturing typically involves time-consuming processes, such as connecting threaded fittings supported by the flexible shaft to threaded surfaces on the transmission housings.

Considering the above drawbacks, what is needed in the art is an improved seeder drive apparatus that addresses one or more of the above drawbacks.

SUMMARY OF THE INVENTION

In one aspect, the present invention provides an apparatus for transmitting power from a drive shaft to a seed meter shaft of a seed metering device. The apparatus includes a transmission having a transmission housing. The transmission housing has a first housing section and a second housing section that is identical to the first housing section. The first housing section and the second housing section together define a first internal passageway and a second internal passageway in communication with the first internal passageway. The transmission further includes a first transmission element rotatably supported by the first housing section and the second housing section in the first internal passageway. The first transmission element connects to one of the drive shaft and the seed meter shaft. The transmission further includes a second transmission element rotatably supported by the first housing section and the second housing section in the second internal passageway. The second transmission element is engaged with the first transmission element and connects to the other of the drive shaft and the seed meter shaft.

In another aspect, the present invention provides an apparatus for transmitting power from a drive shaft to a seed meter shaft of a seed metering device. The apparatus includes a first transmission coupled to one of the drive shaft and the seed meter shaft. The first transmission includes a first transmission housing defining a first internal passageway, a second internal passageway in communication with the first internal passageway, and an external mounting protrusion opposite the second internal passageway. A first transmission element is rotatably supported by the first transmission housing within the first internal passageway. A second transmission element is rotatably supported by the first transmission housing within the second internal passageway and is engaged with the first transmission element. A shaft assembly extends into the second internal passageway and is coupled to the second transmission element. The external mounting protrusion permits insertion of a fastener therethrough to engage the shaft assembly.

In yet another aspect, the present invention provides an apparatus for transmitting power from a drive shaft to a seed meter shaft of a seed metering device. The apparatus includes a first transmission coupled to one of the drive shaft and the seed meter shaft. The first transmission includes a first transmission housing that defines a first internal passageway having a first opening to an exterior of the first transmission housing. The first transmission housing also defines a second internal passageway in communication with the first internal passageway. The second internal passageway has a second opening to the exterior of the first transmission housing and a third opening to the exterior of the first transmission housing. The first transmission further includes a first gear rotatably supported by the first transmission housing within the first internal passageway, and the first gear rotates about a first axis. A second gear is rotatably supported by the first transmission housing within the second internal passageway and is engaged with the first gear. The second gear rotates about a second axis substantially perpendicular to the first axis. The second internal passageway is symmetrical over a plane that bisects the first transmission housing, is substantially parallel to the first axis, substantially perpendicular to the second axis, and disposed between the second and third openings to permit access to the second gear via both of the second and third openings. A shaft assembly has a first end coupled to the second gear by extending through one of the second and third openings, and the shaft assembly has an opposite second end. A second transmission is coupled to the other of the drive shaft and the seed meter shaft, and the second transmission is coupled to the second end of the shaft assembly.

The foregoing and other aspects of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
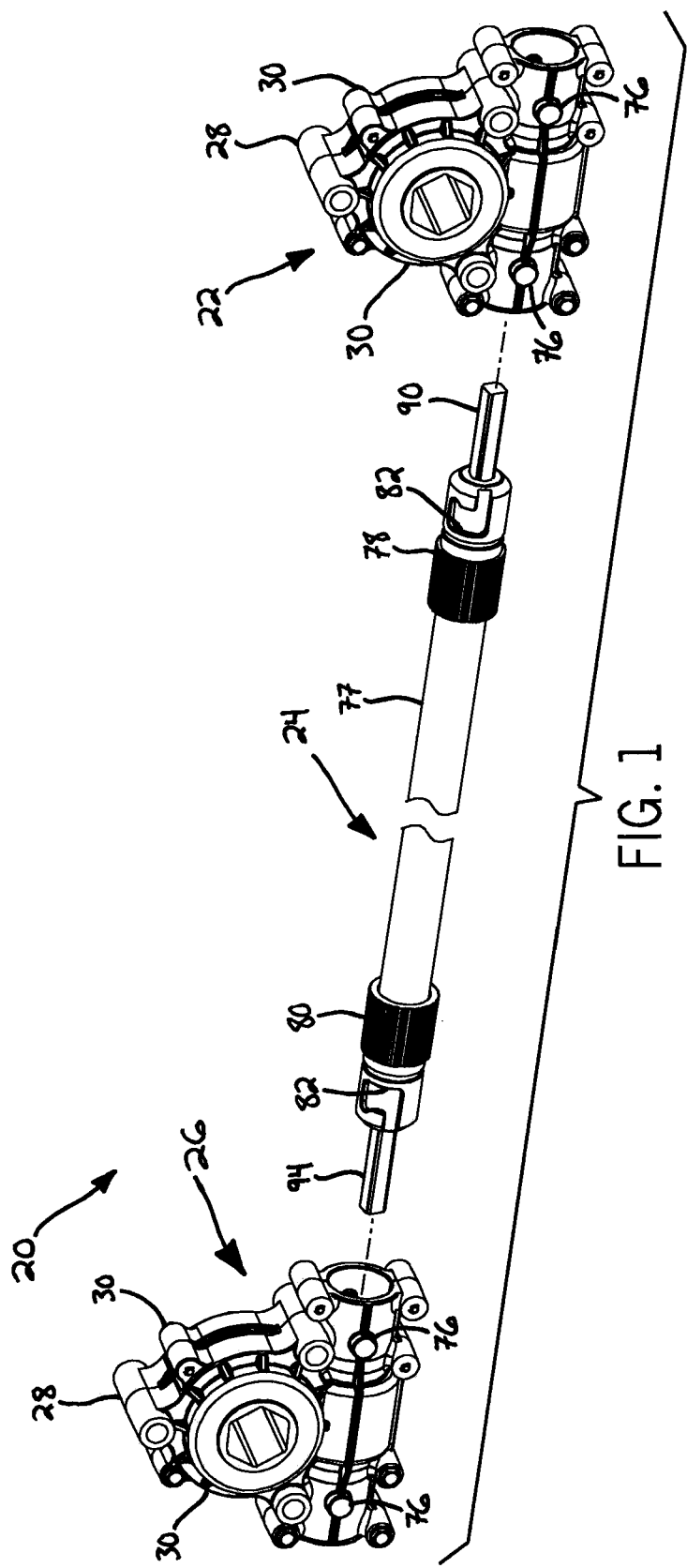
FIG. 1 is an exploded perspective view of a seed metering drive apparatus according to the present invention.

Referring first to FIG. 1, a seed metering device drive system 20 according to the present invention includes two gearboxes or transmissions having identical housings, and each housing includes identical individual housing sections. Such a structure facilitates easy and rapid manufacturing. Furthermore, such a structure facilitates reversibility of the drive system 20 on a seeding implement.

In general, the seed metering device drive system 20 includes a drive shaft gearbox or transmission 22 that is driven by the drive shaft of a seeding implement (not shown). The drive shaft transmission 22 drives a flexible shaft assembly 24, which in turn drives a seed meter gearbox or transmission 26. The seed meter transmission 26 drives the seed meter shaft of the associated seed meter (not shown). The following paragraphs further describe these components of the drive system 20 as well as features that facilitate easy and rapid manufacturing and reversibility of the drive system 20.

Referring now to FIGS. 2-5, the drive shaft transmission 22 includes a transmission housing 28 that facilitates easy and rapid manufacturing and internally supports several power-transmitting components. The transmission housing 28 generally includes two housing "halves" or sections 30 that abut each other along an interface plane (parallel to the page in FIG. 5) and together rotatably support the power-transmitting components.

The housing sections 30 are identical components. As used herein, the term "identical" and variations thereof mean that two components have the same dimensions within specified manufacturing tolerances. However, identical components can be disposed in different locations and orientations. In the case of the housing sections 30, the sections are pivoted by 180 degrees relative to each other and disposed on opposite sides of the interface plane.

Such identical housing sections 30 may be advantageously manufactured using the same equipment. Specifically, the housing sections 30 may be formed using a single injection molding die set. This advantageously reduces overhead costs of housings that require multiple different housing sections and, potentially, multiple different injection molding die sets. In addition, the housing sections 30 may be used interchangeably, thus eliminating the need to identify "left" and "right" housing sections during assembly like in previous designs.

The housing sections 30 include several features for connecting to other components. For example, each housing section 30 includes a plurality of bosses 34 for receiving fasteners 36 to connect the housing sections 30 to each other and the seeding implement. In addition and to facilitate alignment between the housing sections 30, each housing section 30 includes elongated ridges 38 (FIGS. 4 and 5) and elongated channels 40 for receiving the complementary component on the other housing section 30. One half of each housing section 30 (for example, the left half) includes elongated ridges 38 extending along the interface plane proximate the bosses 34, and the other half of each housing section 30 (for example, the right half) includes elongated channels 40 extending along the interface plane proximate the bosses 34.

Internally, the housing sections 30 include features for rotatably supporting the power-transmitting components. In particular, the housing sections 30 each include an opening 42 through which the drive shaft extends. The openings 42 are part of a first internal passageway 44 in which an input transmission element 46 (such as a helical gear having a hexagonal-shaped passageway) is rotatably driven by the drive shaft. Bearings 48 (such as ball bearings) rotatably support the input transmission element 46 about a first axis 49 (FIGS. 4 and 5) that is substantially perpendicular to the interface plane (as used herein, the term "substantially" and variations thereof mean within five degrees).

The first internal passageway 44 is in communication with a second internal passageway 50 that is symmetrical over a plane 51 (FIG. 5) bisecting both the first and second internal passageways 44 and 50 and substantially perpendicular to the interface plane. Advantages of this symmetry are described in further detail below.

The second internal passageway 50 includes a central portion 52 that houses an output transmission element 54 (such as a helical gear having a square-shaped internal passageway) driven by the input transmission element 46. Bearings 56 (such as ball bearings) rotatably support the output transmission element 54 about a second axis 55 (FIG. 5) that is substantially parallel to the interface plane. That is, the output transmission element 54 rotates about an axis 55 substantially perpendicular to the axis 49 of the input transmission element 46.

Figure 2:
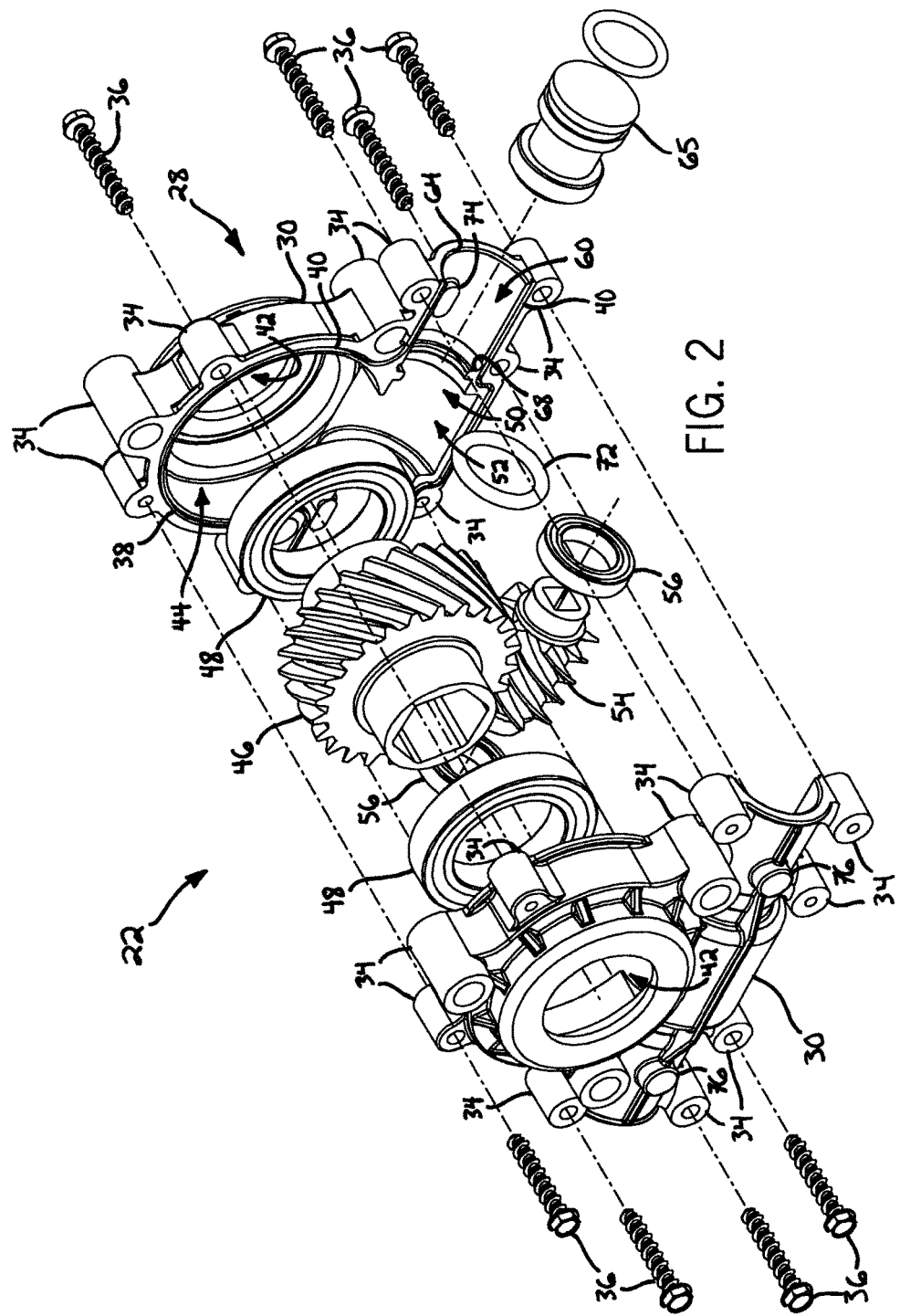
FIG. 2 is an exploded perspective view of a transmission of the seed metering drive apparatus of FIG. 1.
Figure 3:
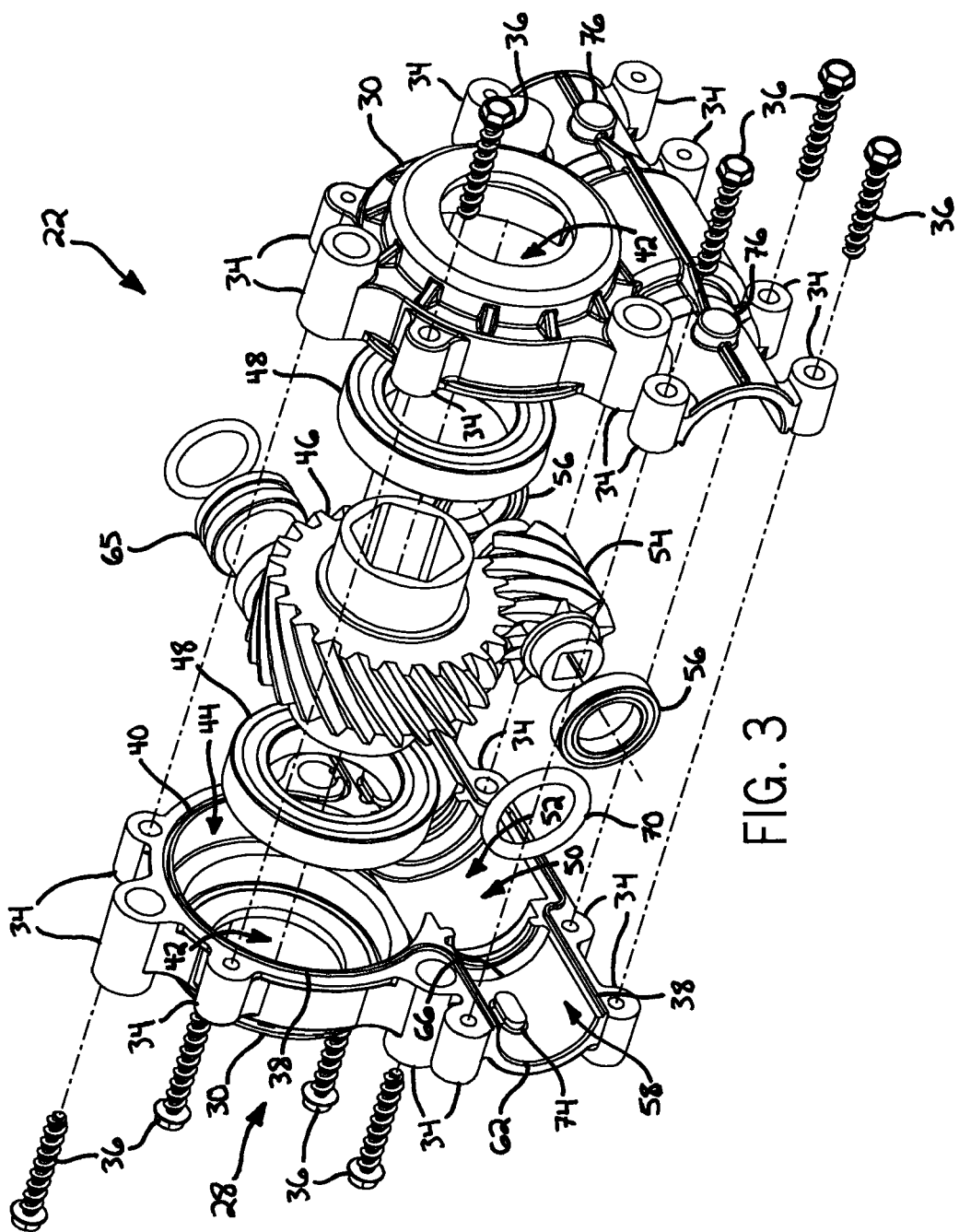
FIG. 3 is an exploded perspective view of the transmission from a different angle than FIG. 2.
Figure 4:
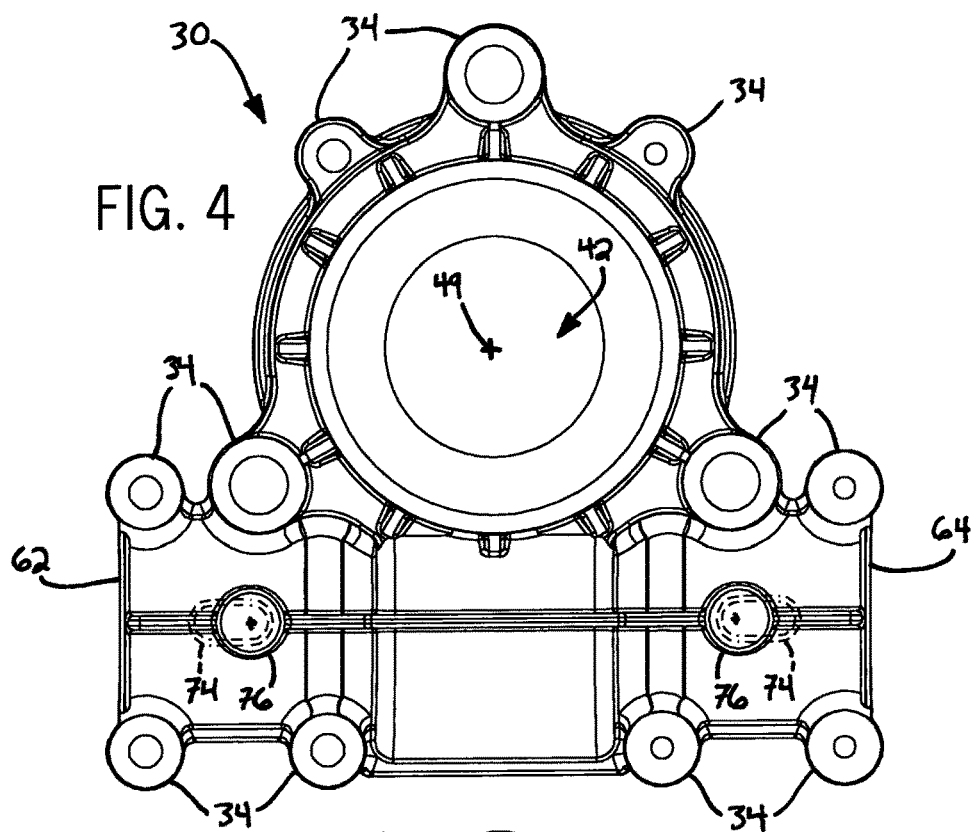
FIG. 4 is a front view of a housing section of the transmission of FIG. 2.
Figure 5:
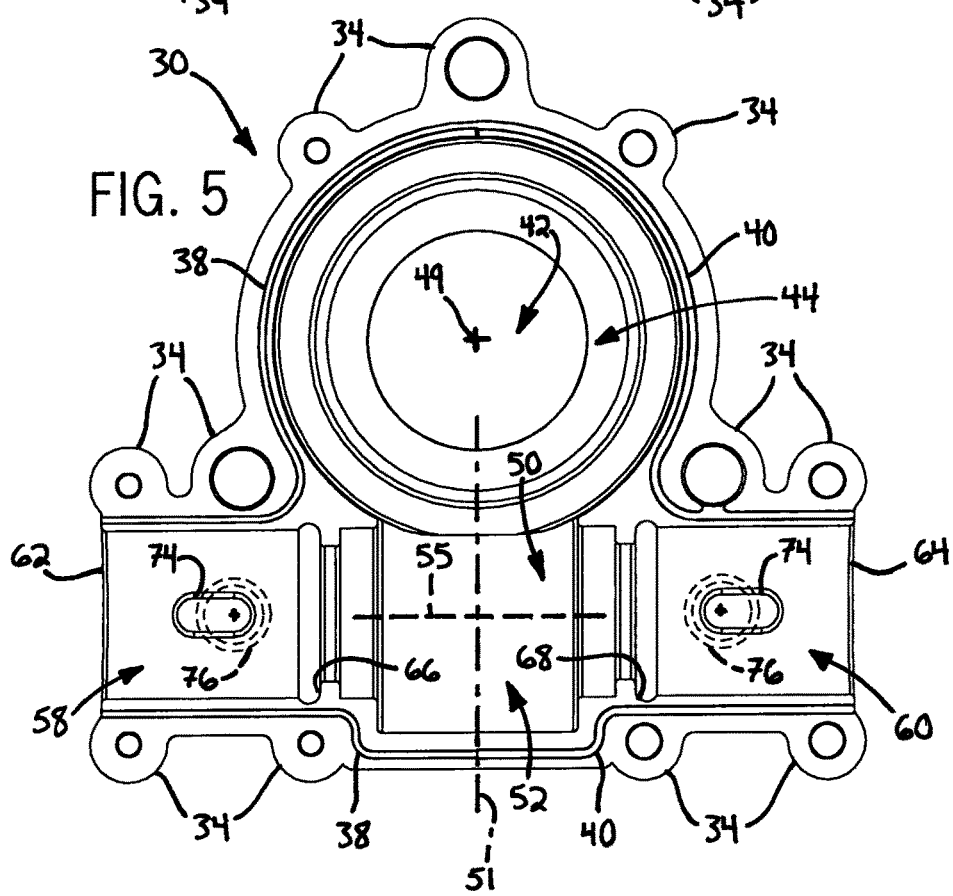
FIG. 5 is a rear view of the housing section of FIG. 4.

To each side of the central portion 52, the second internal passageway 50 includes side portions 58 and 60 having first and second openings 62 and 64, respectively, defined by both of the housing sections 30. Each of the side portions 58 and 60 is capable of receiving the flexible shaft assembly 24 and facilitating attachment to the output transmission element 54. As such, the orientation of the transmission 22 is reversible relative to the flexible shaft assembly 24. The side portion 58 or 60 that does not receive the shaft assembly 24 may receive a sealing plug 65 (FIGS. 2 and 3).

The transmission housing 28 also includes features for engagement with the flexible shaft assembly 24. In particular, the side portions 58 and 60 of the second internal passageway 50 each include o-ring support surfaces 66 and 68, respectively. The support surfaces 66 and 68, as the name implies, support o-rings 70 and 72, respectively, that are capable of abutting the flexible shaft assembly 24 as described in further detail below.

The side portions 58 and 60 of the second internal passageway 50 each also include oval-shaped protrusions 74 that are elongated in the direction of the second axis 55. The protrusions 74 define, in part, a connection interface or bayonet connection for securing the flexible shaft assembly 24 to the transmission housing 28. This aspect is described in further detail below.

Externally, each housing section 30 also supports two mounting or circular protrusions 76. Each circular protrusion 76 shares a common centerline with one of the semi-circular portions of one of the oval-shaped protrusions 74. As such, each circular protrusions 76 permits insertion of a fastener (not shown) through the circular protrusion 76, the adjacent oval-shaped protrusion 74, and into the shaft assembly 24 to secure the shaft assembly 24 to the transmission housing 28.

Figure 6:
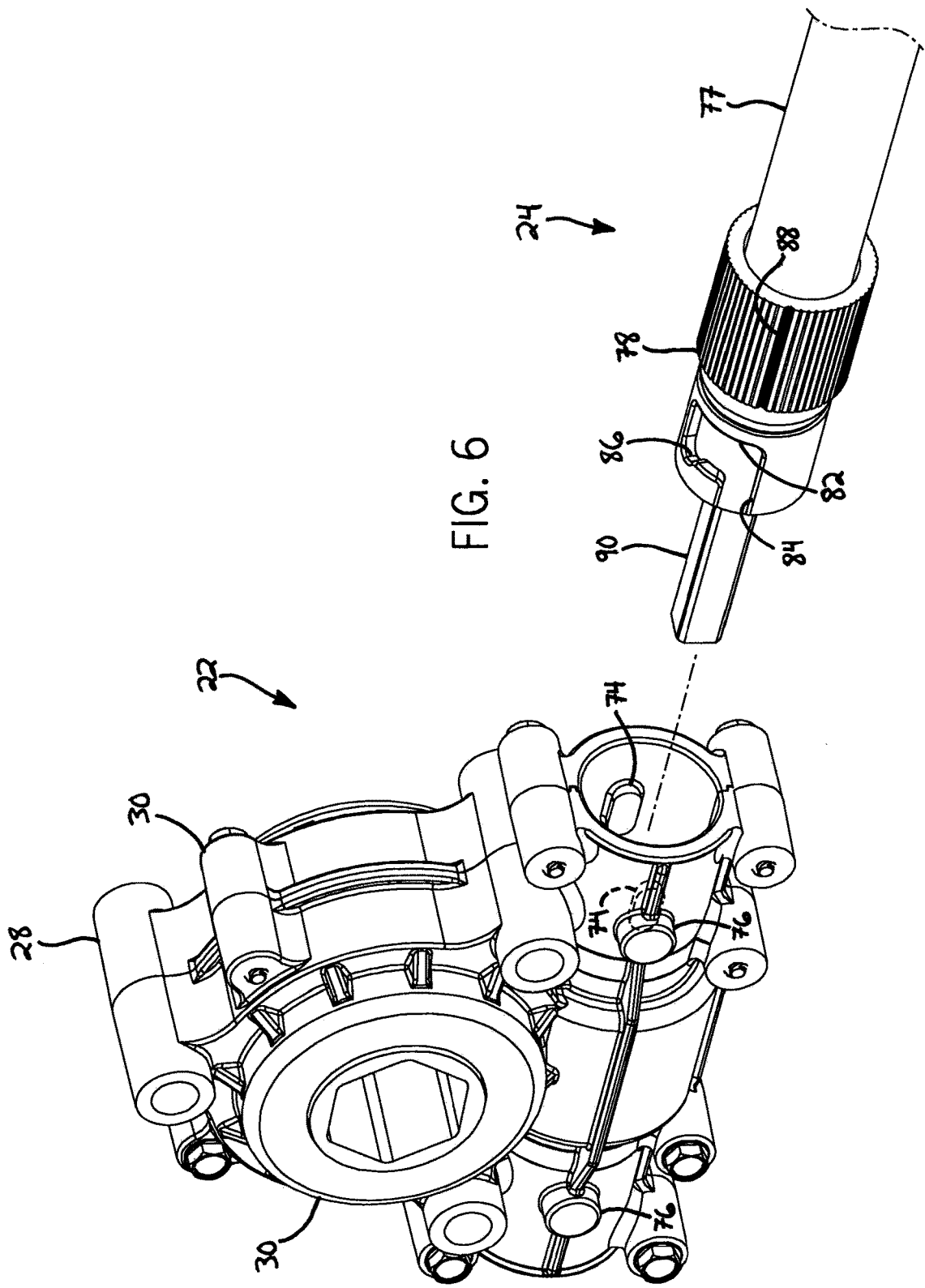
FIG. 6 is a perspective view of the transmission and a shaft assembly of the seed metering drive apparatus of FIG. 1.
Figure 7:
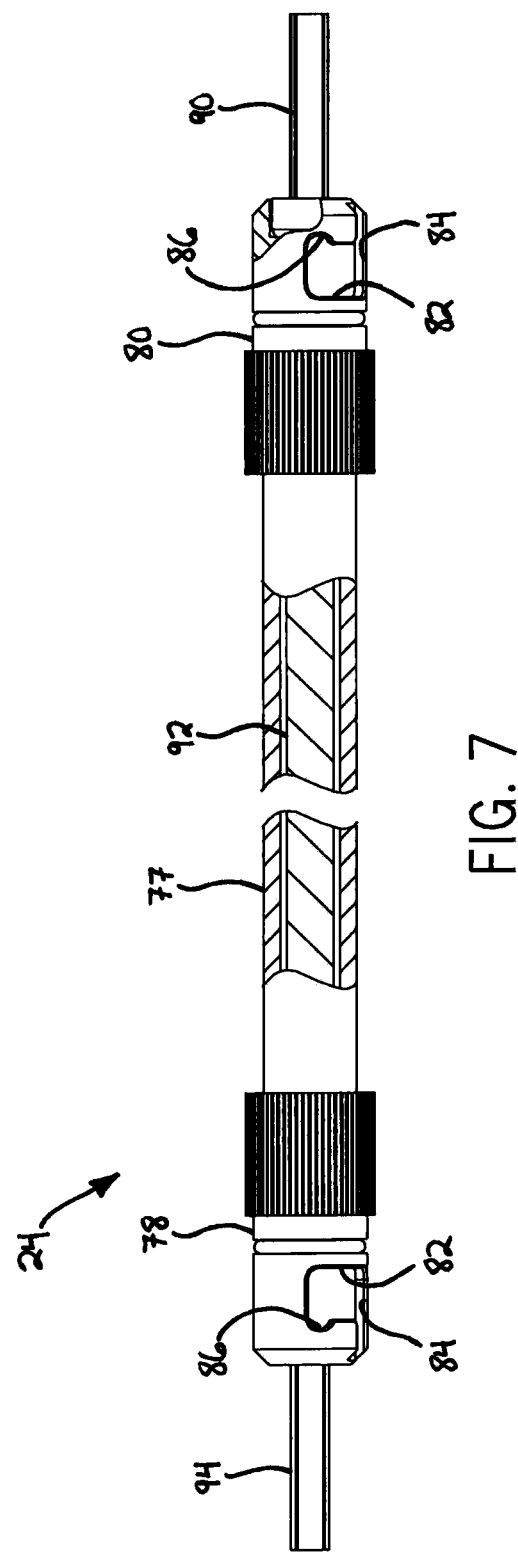
FIG. 7 is a partial longitudinal sectional view of the shaft assembly of FIG. 6.

Turning now to FIGS. 6 and 7, the flexible shaft assembly 24 connects to the drive shaft transmission 22 and receives rotary power therefrom. The flexible shaft assembly 24 includes a housing 77 that supports two identical transmission couplings 78 and 80 near opposite ends of the shaft assembly 24.

The transmission couplings 78 and 80 are received in and secure the flexible shaft assembly 24 to the drive shaft transmission 22 and the seed meter transmission 26, respectively. Each coupling 78 and 80 includes bayonet recesses 82 for receiving the bayonet protrusions 74 and thereby securing the couplings 78 and 80 to the transmission housings 28. Each bayonet recess 82 includes a receiving portion 84 through which one of the protrusions 74 initially passes before the coupling 78 or 80 is pivoted to move the protrusion 74 into an adjacent locking portion 86. As such, the protrusions 74 are disposed in the locking portions 86 to maintain the connection between the shaft assembly 24 and the transmission housings 28. Furthermore, one of the o-rings 70 and 72 (FIGS. 2 and 3) supported within the transmission housing 28 abuts the coupling 78 or 80 and urges it away from the transmission housing 28. This action causes the wall of the locking portions 86 to abut the protrusions 74 to further secure the shaft assembly 24 to the transmission housings 28.

The couplings 78 and 80 may further include demarcations 88 (FIG. 6) aligned with one of the receiving portions 84. As such, the demarcations 88 indicate the orientation of the bayonet recesses 82 when connecting or disconnecting the flexible shaft assembly 24 to the transmission housings 28.

The couplings 78 and 80 and the housing 77 rotatably support several internal power-transmitting components. In particular, the coupling 78 and the housing 77 rotatably support a flexible shaft input connector 90 that connects to and is driven by the output transmission element 54. In some embodiments and as shown in the figures, the flexible shaft input connector 90 has a square cross-sectional shape that is received in the internal passageway of the output transmission element 54. Alternatively, the flexible shaft input connector 90 may have a different cross-sectional shape that it is capable of being received in the internal passageway of the output transmission element 54 and driven by the output transmission element 54. As another alternative, the output transmission element 54 may have a positive shape (e.g., a square cross-sectional shaped shaft) and the flexible shaft input connector 90 may have the inverse shape (e.g., a square cross-sectional passageway).

The flexible shaft input connector 90 connects to a flexible core or shaft 92 (FIG. 7) via, e.g., a crimped connection (not shown). The flexible shaft 92 may be of any appropriate type, such as the flexible shafts including multiple layers of helically extending wires produced by Elliott Manufacturing of Binghamton, N.Y. In general, the flexible shaft 92 is a semi-flexible component that transmits power between the drive shaft transmission 22 and the seed meter transmission 26. As used herein, the term "semi-flexible" and variations thereof mean that a component can support a torsional load, offsets when subjected to axial compressive and side bending loads, and can stretch when subjected to an axial tension load. In addition, such components can significantly change shape without experiencing plastic deformation when first placed in a taut configuration and then subjected to compressive and/or bending loads. Stated another way, a longitudinal axis of the component can extend along one or more significant curves without subjecting the component to plastic deformation, and the component can be bent into a curved shape so as to exert a rotary driving torque about its axis from one end to the other while achieving and then maintaining the curved shape. Stated yet another way, the semi-flexible structure permits the flexible shaft 92 to rotate while connecting two couplings that are misaligned (i.e., the flexible shaft input connector 90 and a flexible shaft output connector 94 connected to the opposite side of the shaft 92).

The flexible shaft 92 connects to a rotatable flexible shaft output connector 94 opposite the flexible shaft input connector 90. The flexible shaft 92 may connect to the flexible shaft output connector 94 via, e.g., a crimped connection (not shown). In some embodiments and as shown in the figures, the flexible shaft output connector 94 has a square cross-sectional shape that is generally identical to the shape of the flexible shaft input connector 90.

The flexible shaft output connector 94 connects to and drives the seed meter transmission 26. The seed meter transmission 26 is similar to the drive shaft transmission 22. In particular, the seed meter transmission 26 has a transmission housing 28 identical to that of the drive shaft transmission 22. As such, the housing sections 30 for both of the transmissions 22 and 26 may be advantageously formed using a single injection molding die set. Other components of the seed meter transmission 26 are similar to those of the drive shaft transmission 22, although the transmission elements 46 and 54 may provide a different transmission ratio. In addition, the transmission element 54 acts as an input and connects to the shaft assembly 24, and the transmission element 46 acts as an output and drives the seed meter shaft.

The seed metering device drive system 20 may be modified in other manners that are not explicitly described above. For example, the transmission housings 28 may support the bayonet recesses 82 and the shaft couplings 78 and 80 may support the bayonet protrusions 74.

From the above description, it should be apparent that the present invention provides a seed meter drive system that includes gearboxes or transmissions having identical housings, and each housing includes identical individual housing sections. Such a structure facilitates easy and rapid manufacturing. Furthermore, such a structure facilitates reversibility of the drive system on a seeding implement. The transmission housings also include mounting protrusions that are capable of receiving fasteners. These fasteners pass through a bayonet connection and engage the flexible drive shaft assembly to further secure the assembly to the transmissions.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. An apparatus for transmitting power from a drive shaft to a seed meter shaft of a seed metering device, comprising:
   a transmission including:
      a transmission housing having a first housing section and a second housing section divided by a plane, the first housing section and the second housing section being identical to each other in a direction facing the plane, the first housing section and the second housing section together defining:
         a first internal passageway;
         a second internal passageway in communication with the first internal passageway;
      a first transmission element rotatably supported by the first housing section and the second housing section in the first internal passageway, the first transmission element connected to one of the drive shaft and the seed meter shaft; and
      a second transmission element rotatably supported by the first housing section and the second housing section in the second internal passageway, the second transmission element being engaged with the first transmission element and connected to the other of the drive shaft and the seed meter shaft.

2. The apparatus of claim 1, wherein the first transmission element rotates about a first axis, the second transmission element rotates about a second axis, and the first housing section and the second housing section engage each other along a plane substantially parallel to the second axis.

3. The apparatus of claim 2, wherein the first axis is substantially perpendicular to the second axis.

4. The apparatus of claim 1, wherein second internal passageway includes a first opening and a second opening such that the second transmission element may be engaged via one of the first opening and the second opening.

5. The apparatus of claim 1, wherein the transmission is a first transmission and the transmission housing is a first transmission housing, and further comprising:
   a shaft assembly coupled to the second transmission element; and
   a second transmission coupled to the shaft assembly opposite the first transmission, the second transmission including a second transmission housing identical to the first transmission housing.

6. The apparatus of claim 1, further comprising:
   a shaft assembly coupled to the second transmission element and connected to the other of the drive shaft and the seed meter shaft;
   a bayonet connection including:
   a bayonet protrusion supported by one of the shaft assembly and the transmission housing within the second internal passageway; and
   a bayonet recess defined by the other of the shaft assembly and the transmission housing within the second internal passageway, the bayonet recess receiving the bayonet protrusion.

7. The apparatus of claim 6, wherein the transmission housing supports the bayonet protrusion within the second internal passageway, the bayonet protrusion having an oval shape, wherein an external surface of the transmission housing supports a circular protrusion opposite the bayonet protrusion, and the circular protrusion and the bayonet protrusion have a common centerline to permit insertion of a fastener into the bayonet connection via the circular protrusion.

8. An apparatus for transmitting power from a drive shaft to a seed meter shaft of a seed metering device, comprising:
   a first transmission coupled to one of the drive shaft and the seed meter shaft, the first transmission including:
      a first transmission housing defining a first internal passageway, a second internal passageway in communication with the first internal passageway, and an external mounting protrusion opposite the second internal passageway;
      a first transmission element rotatably supported by the first transmission housing within the first internal passageway;
      a second transmission element supported by the first transmission housing within the second internal passageway for rotation about a rotational axis and engaged with the first transmission element; and
      a shaft assembly extending into the second internal passageway and coupled to the second transmission element for rotation about the rotational axis;
   wherein the external mounting protrusion permits insertion of a fastener therethrough along a protrusion axis intersecting the rotational axis to engage the shaft assembly.

9. The apparatus of claim 8, wherein the shaft assembly includes a coupling received in the second internal passageway, the coupling being configured to receive the fastener.

10. The apparatus of claim 9, further comprising a bayonet connection including:
    a bayonet protrusion supported by one of the coupling and the first transmission housing within the second internal passageway; and
    a bayonet recess defined by the other of the coupling and the first transmission housing within the second internal passageway, the bayonet recess receiving the bayonet protrusion.

11. The apparatus of claim 10, wherein the first transmission housing supports the bayonet protrusion within the second internal passageway, the bayonet protrusion having an oval shape, wherein the external mounting protrusion is a circular protrusion, and the circular protrusion and the bayonet protrusion have a common centerline to permit insertion of the fastener to engage the coupling.

12. The apparatus of claim 8, wherein the first transmission housing includes:
    a first housing section disposed on a first side of the first and second transmission elements; and
    a second housing section disposed on a second side of the first and second transmission elements, the second housing section being identical to the first housing section.

13. The apparatus of claim 8, further comprising a second transmission coupled to the shaft assembly opposite the first transmission, the second transmission including a second transmission housing identical to the first transmission housing.

14. An apparatus for transmitting power from a drive shaft to a seed meter shaft of a seed metering device, comprising:
    a first transmission coupled to one of the drive shaft and the seed meter shaft, the first transmission including:
       a first transmission housing defining a first internal passageway having a first opening to an exterior of the first transmission housing, and a second internal passageway in communication with the first internal passageway and having a second opening to the exterior of the first transmission housing and a third opening to the exterior of the first transmission housing;

a first gear rotatably supported by the first transmission housing within the first internal passageway, the first gear rotating about a first axis;

a second gear rotatably supported by the first transmission housing within the second internal passageway and engaged with the first gear, the second gear rotating about a second axis substantially perpendicular to the first axis;

wherein the second internal passageway is symmetrical over a plane bisecting the first transmission housing, substantially parallel to the first axis, substantially perpendicular to the second axis, and disposed between the second and third openings to permit access to the second gear via both of the second and third openings;

a shaft assembly having a first end coupled to the second gear by extending through one of the second and third openings, and the shaft assembly having an opposite second end; and a second transmission coupled to the other of the drive shaft and the seed meter shaft, and the second transmission coupled to the second end of the shaft assembly.

15. The apparatus of claim 14, wherein the first end of the shaft assembly includes a coupling received in the second internal passageway, and further comprising a bayonet connection including:

a bayonet protrusion supported by one of the coupling and the first transmission housing within the second internal passageway; and a bayonet recess defined by the other of the coupling and the first transmission housing within the second internal passageway, the bayonet recess receiving the bayonet protrusion.

16. The apparatus of claim 15, further comprising an a-ring supported by the first transmission housing within the second internal passageway, the a-ring abutting the coupling to bias the bayonet connection into engagement.

17. The apparatus of claim 15, wherein the first transmission housing supports the bayonet protrusion within the second internal passageway, the bayonet protrusion having an oval shape, wherein an external surface of the first transmission housing supports a circular protrusion opposite the bay net protrusion, and the circular protrusion and the bayonet protrusion have a common centerline to permit insertion of a fastener into the bayonet connection via the circular protrusion.

18. The apparatus of claim 14, wherein the shaft assembly includes a flexible core coupling the first transmission and the second transmission.

19. The apparatus of claim 14, wherein the first transmission housing includes:

a first housing section disposed on a first side of the first and second gears; and a second housing section disposed on a second side of the first and second gears, the second housing section being identical to the first housing section.

20. The apparatus of claim 14, wherein the second transmission includes a second transmission housing being identical to the first transmission housing.

* * * * *